United States Patent [19]

Yoshioka et al.

[11] Patent Number: 5,005,181
[45] Date of Patent: Apr. 2, 1991

[54] METHOD FOR CONTROLLING GAS IN HALOGEN GAS LASER AND DEVICE THEREFOR

[75] Inventors: Takeo Yoshioka; Tadao Minagawa, both of Hyogo, Japan

[73] Assignee: Mitsubishi Denki K.K., Tokyo, Japan

[21] Appl. No.: 409,916

[22] Filed: Sep. 20, 1989

[30] Foreign Application Priority Data

Oct. 20, 1988 [JP] Japan ................................. 265470

[51] Int. Cl.5 ............................................ H01S 3/22
[52] U.S. Cl. .................................... 372/59; 372/57
[58] Field of Search ..................... 372/59, 58, 57, 55

[56] References Cited

U.S. PATENT DOCUMENTS

| 4,674,099 | 6/1987 | Turner | 372/59 |
| 4,722,090 | 1/1988 | Harota et al. | 372/59 |
| 4,723,254 | 2/1988 | Turner | 372/59 |
| 4,740,982 | 4/1988 | Hakota et al. | 372/59 |

Primary Examiner—Léon Scott, Jr.
Attorney, Agent, or Firm—Sughrue, Mion, Zinn, Macpeak & Seas

[57] ABSTRACT

A gas control device in a halogen gas laser device which comprises: a filter for receiving a small quantity of deteriorated gas from the upstream portion of the laser gas circulating path to convert it into a low-boiling-point gas; and a gas detector for measuring the density of the low-boiling-point gas thus formed, to estimate the halogen gas density, and outputting, when the density is lower than a predetermined value, an instruction signal to supply halogen gas.

22 Claims, 1 Drawing Sheet

METHOD FOR CONTROLLING GAS IN HALOGEN GAS LASER AND DEVICE THEREFOR

FIELD OF THE INVENTION

The present invention relates to a method for controlling gas in a halogen gas laser and a device therefore, and more particularly to the supply of halogen gas to the gas control device.

BACKGROUND OF THE INVENTION

One example of a halogen gas laser device of this type is proposed in Japanese Patent Application (OPI) No. 6384183 (the term "OPI" as used herein means an "unexamined published application").

An excimer laser device uses ArF, KrF, XeCl or XeF as its laser active medium. In the excimer laser device, pulse discharge is caused between the anode and the cathode in a mixture of inert gas such as Ar, Kr or Xe and halogen gas such as $F_2$:, $NF_3$:, $Cl_2$ or HCl or halogen compound gas, to generate a laser beam. The service life of the excimer laser device is adversely affected by factors such as deterioration of the laser gas, deterioration of the laser reflection mirrors, deterioration of the switching element, deterioration of the main capacitor, and deterioration of the preliminary ionization, etc. Against each of these factors, efforts have been developing to lengthen the service life of the excimer laser device. Since the above-described inert gases are expensive in general and, therefore, the excimer laser device is so designed as to operate in a sealed-off tube.

However, since the halogen gases are high in chemical reactivity, a remarkable chemical reaction occurs at the electrodes thereby deteriorating the gas.

FIG. 1 is a rough view showing the above-described excimer laser device having a gas reproducing system. The halogen gas used in a laser oscillation section 1 is circulated, in a sealing mode, through a laser gas circulating path 2, a dust filter 3, a circulating pump 4, an ultraviolet-ray applying section 6, and a low-temperature trap 5.

FIG. 2 is a partial perspective view, with parts cut away, showing the ultraviolet-ray applying section 6 in the gas circulating path. As shown in FIG. 2, a gas pipe 6b and an ultraviolet-ray generating lamp 6c are arranged in parallel with each other in an elliptic-cylinder type reflecting mirror 6a, and the electric power from a power source 6d is supplied to the ultraviolet-ray generating lamp 6c.

The halogen gas used by the laser oscillation section 1 is a mixture of hydrogen chloride (HCl), xenon (Xe) and helium (He). The wavelength of the output laser beam is 308 nanometers. These gases react and change at the electrode section. A part of the hydrogen chloride gas is decomposed into hydrogen gas ($H_2$) and chlorine gas ($Cl_2$), as a result of which the hydrogen chloride gas density is lowered and, accordingly, the intensity of the laser output is lowered.

The deteriorated gas containing the hydrogen gas and chlorine gas which flows along the laser gas circulating path 2 is sent to the dust filter 3, where solid materials are removed therefrom. The gas thus treated is delivered to the ultraviolet-ray applying section 6 by the circulating pump 4. When being exposed to the ultraviolet-rays at the ultraviolet-ray applying section 6, the hydrogen ($H_2$) and chlorine ($Cl_2$) react as follows:

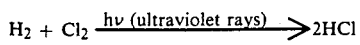

$$H_2 + Cl_2 \xrightarrow{h\nu \text{ (ultraviolet rays)}} 2HCl \tag{1}$$

Thus, hydrogen chloride gas HCl is reproduced. The gas HCl thus reproduced is sent to the low-temperature trap 5, where high boiling point impurities are removed from it. The gas thus treated is returned to the laser oscillation section 1.

The proposed gas control device for a halogen gas laser is constructed as described above. Therefore, in the case of the excimer laser device using a hydrogen chloride gas (HCl) as its halogen gas, the hydrogen gas ($H_2$) and chlorine gas ($Cl_2$) formed by decomposition are used to reproduce a hydrogen chloride gas (HCl), whereby the service life of the operating gas can be somewhat lengthened. On the other hand, in the case of the excimer laser device using a fluorine gas ($F_2$) still suffers from the following difficulty: In the excimer laser device, fluoride is formed through electric discharge between the electrodes, and therefore it is difficult to reproduce a fluorine gas in order to increase the service life of the laser gas.

SUMMARY OF THE INVENTION

Accordingly, an object of the present invention is to eliminate the above-described difficulties accompanying a conventional halogen gas reproducing device. More specifically, an object of the invention is to provide a method for controlling gas in an excimer laser device to maintain a fluorine gas at a predetermined value by measuring it.

Another object of the invention is to provide a halogen gas reproducing device in which the density of halogen gas in an excimer laser device using a fluorine gas is maintained at a predetermined value by measuring it accurately, and maintenance of the gas system is simplified accordingly.

The above and other objects of the present invention can be achieved by a provision of a gas control device in a halogen gas laser device which, according to the invention, comprises: a filter for receiving a small quantity of deteriorated gas from the upstream portion of the laser gas circulating path to convert it into a low-boiling-point gas; and a gas detector for measuring the density of the low-boiling-point gas thus formed, to estimate the halogen gas density, and outputting, when the density is lower than a predetermined value, an instruction signal to supply halogen gas.

In the gas control device according to the invention, the deteriorated gas received from the upstream portion of the laser gas circulating path is converted into a low-boiling-point gas, and the density of the latter is measured thereby to estimate the halogen density. If the density is lower than the predetermined value, then halogen gas high in density is supplied to maintain the density of halogen gas in the system at the predetermined value.

In the case where the halogen gas is a fluorine gas, the low-boiling-point gas provides a hydrogen gas ($H_2$) and calcium fluoride ($CaF_2$). In this case, for instance the density of the hydrogen gas is measured to determine the density of deteriorated hydrogen gas.

DESCRIPTION OF THE PREFERRED EMBODIMENT

Figure 1:
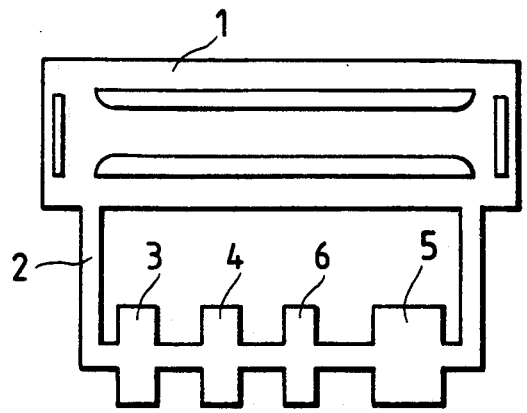
FIG. 1 is an explanatory diagram illustrating the arrangement of a conventionally proposed halogen gas excimer laser device.
Figure 2:
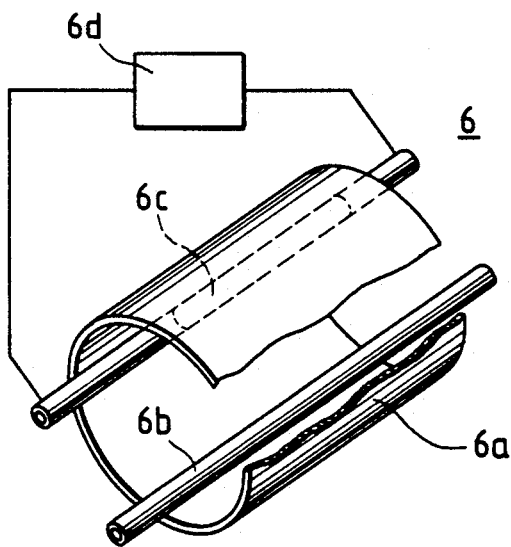
FIG. 2 is a perspective view, with parts cut away, showing an ultraviolet-ray applying section in the laser device illustrated in FIG. 1.
Figure 3:
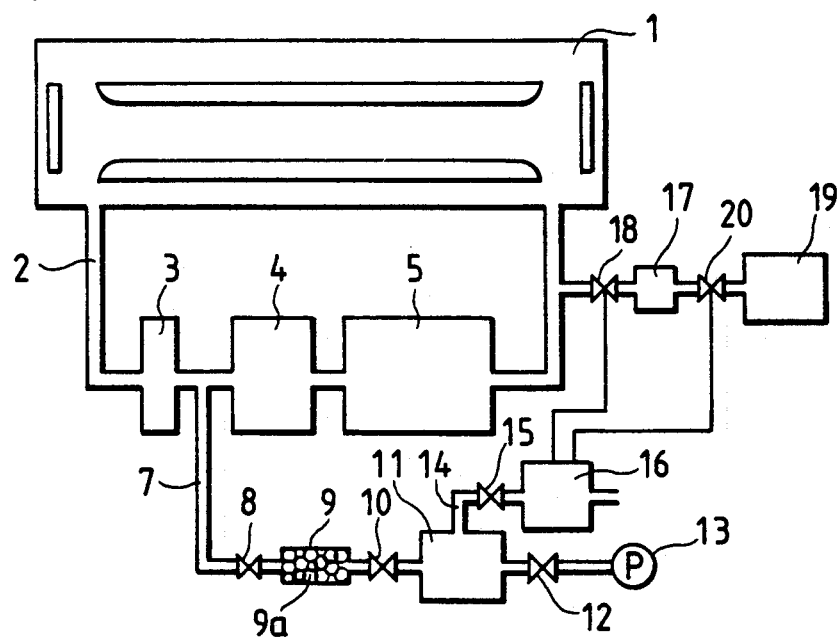
FIG. 3 is an explanatory view showing the arrangement of a halogen gas excimer laser device according to an embodiment of the present invention.

A preferred embodiment of the present invention will now be described with reference to FIG. 3. In FIG. 3, like parts and components are designated by the same reference numerals as that in FIG. 1.

As shown in FIG. 3, a laser oscillation section 1 for generating a laser beam using a fluorine gas is communicated with a laser gas circulating path 2. In the circulating path 2, a dust filter 3, a circulating pump 4, and a low temperature trap 5 are provided in the stated order, thus forming a circulation circuit through which the fluorine gas is purified and returned to the laser oscillation section 1.

Upstream of the laser gas circulating path 2, the connecting point of the dust filter 3 and the circulating pump 4 is connected to a controlling gas path 7 which is connected through a solenoid valve 8, a filter 9, and a solenoid valve 10, to a gas storing chamber 11. A vacuum pump 13 is connected to the gas storing chamber 11 through a solenoid valve 12. The gas storing chamber 11 is also connected to a branch path 14, which is connected through a solenoid valve 15 to a gas detector 16. The gas detector 16 is of thermal conduction type in this embodiment, and it detects the density of gas. According to the density of gas, the gas detector 16 outputs control signals to control a solenoid valve 18 provided at the outlet of a first halogen gas storing chamber 17 which is opened downstream of the laser gas circulating path 2, and a solenoid valve 20 which is provided between the first halogen gas storing chamber 17 and a second halogen gas storing chamber 19.

In the case where the halogen gas laser device thus constructed use a fluorine gas ($F_2$) as its main halogen gas, argon gas (Ar), krypton gas (Kr), Neon gas (Ne) and helium gas (He) may be used as mixing gases in addition to the fluorine gas. The mixing gases except the fluorine gas are inert gases and, therefore, they do not substantially combine with other materials (atoms) except those located at the laser oscillation region in the electric discharge section.

However, the compound of material of discharge electrode metal and fluorine gas is formed. For instance, in the case where the discharge electrodes are of nickel (Ni), nickel fluoride ($NiF_2$) is formed. The reaction of nickel, an electrode material, with fluorine gas is relatively low, but it is not so low as can be disregarded. Accordingly, gradual decrease of the density of the fluorine gas is not avoidable and, accordingly, intensity of the laser output will be gradually decreased.

In view of the foregoing, in the invention, the density of halogen gas such as fluorine gas is measured, and when the density comes to be lower than a predetermined value, the gas is supplemented. For this purpose, first the solenoid valves 8 and 15 are closed while the solenoid valves 10 and 12 are opened. Under this condition, the vacuum pump 13 is operated until a predetermined degree of vacuum is obtained. After the vacuum reaches the predetermined degree, the solenoid valves the 10 and 12 are closed, and then the solenoid valve 8 is opened. As a result, the deteriorated gas is caused to flow through the laser gas circulating path 2 and the controlling gas path 7 into the filter 9. The filter 9 is filled with reaction material 9a. The reaction material 9a reacts with the deteriorated fluorine gas, thus forming a low boiling point gas. For instance where the reaction material 9a is calcium hydride ($CaH_2$), the following reaction occurs:

$$F_2 + CaH_2 \rightarrow CaF_2 + H_2 \qquad (2)$$

As a result, the fluorine gas is lost, and a mixture gas of argon (Ar), krypton (Kr), Neon (Ne) and helium (He) is produced. After that, when the solenoid valve 10 is opened, the mixture gas thus produced is introduced into the gas storing chamber 11 and stored therein. Since the total pressure of the mixture gas is of the order of 0.3 MPa in general in the excimer laser device using fluorine gas, the pressure in the gas storing chamber 11 is equal to that value.

Thereafter, when the solenoid valve 15 is opened under a condition in which the solenoid valves 8, 10, 12, 18 and 20 are closed, the mixture gas is caused to flow from the gas storing chamber 11 through the branch path 14 into the gas detector 16, and then discharged outside from an opening of the gas detector. During this operation, the gas detector 16 detects the hydrogen gas density which is proportional to the fluorine gas density. When it is determined that the density is equal to or higher than the predetermined value, nothing is operated. On the other hand, if the detected density is less than the predetermined value, the solenoid valve 20 is opened. As a result, the fluorine gas or the mixture gas of fluorine gas, argon gas, krypton gas, Neon gas (Ne) and helium gas is supplied from the second halogen gas storing chamber 19 into the first halogen gas storing chamber 17. The capacity of the first halogen gas storing chamber 17 is set to 5% to or less than that in the entire system of the halogen gas laser device, so that the addition of the gas may not substantially affect the gas pressure in the system.

Thereafter, the gas detector 16 operates to open the solenoid valve 18, so that the gas is discharged from the first halogen gas storing chamber 17 into the downstream portion of the laser gas circulating path 2, and then the detector operates to close the solenoid valve 18. Thus, the fluorine gas density in the system is always maintained at the predetermined value.

The above-described gas control cycle that the gas density is detected and the gas may desirably supplemented when necessary may be carried out every predetermined interval, or it may be carried out when necessary, or before and/or after the operation of the laser device. Alternatively, the gas control may be included in the operation sequence.

In the above-described embodiment, although the main halogen gas is fluorine gas, however, hydrogen chloride gas (HCl), chlorine gas ($Cl_2$) or the like may selectively be used.

Further, in the above-described embodiment, although the reaction material 9a is calcium hydride ($CaH_2$), however, it may be replaced by sodium hydrogencarbonate ($NaHCO_3$).

Furthermore, in the above-described embodiment, the gas detector is of thermal conduction type, however, it may be replaced, for example, by a gas detector which generates heat at the time of combustion or the like.

As is apparent from the above description, the present invention includes the following gas control devices:

(a) In a halogen gas excimer laser device using a fluorine gas, hydrogen chloride gas, and chlorine gas as the halogen gas, a gas control device in which, with the halogen gas converted into a low-boiling-point gas, the halogen gas density is indirectly detected, and according to the halogen gas signal, new halogen gas (not deteriorated yet) is injected into the laser system.

(b) The gas control device as described in paragraph (a), in which the low-boiling-point gas is a hydrogen gas.

(c) The gas control device as described in paragraph (a), in which the low-boiling-point gas measuring method is based on combustion heat or thermal conduction.

(d) The gas control device as described in paragraph (a), in which low-boiling-point gas producing means comprises: a reaction filter filled with calcium hydride ($CaH_2$) or sodium hydrogencarbonate ($NaHCO_3$); and a gas storing chamber provided downstream of the reaction filter.

(e) The gas control device as described in paragraph (a), in which the capacity of the halogen gas storing chamber is 5% or less than that of the entire system of the halogen gas laser device.

As was described above, with the gas control device of the invention, the gas density determining the output of the gas laser device can be detected with high accuracy and, therefore, the halogen gas density in the system of the gas laser device can be maintained at the predetermined value. Thus, maintenance of the gas laser device can be achieved with ease, that is, the gas laser device can be operated for a long period of time being free from the maintenance.

What is claimed is:

1. A gas control device for a halogen gas excimer laser using a laser gas comprising a halogen gas as the active medium, comprising:
   means for pumping said laser and causing said laser to oscillate;
   means for circulating said laser gas through said laser, said circulating means communicating with said laser pumping means;
   means for controlling a flow of said laser gas circulating in said laser gas circulating means;
   means for storing new halogen gas, said new halogen gas storing means being controllably connected to said circulating means;
   means connected to said circulating means for converting said halogen gas into a low-boiling-point gas; and
   means for detecting a density of said low-boiling-point gas, said detecting means being connected to said converting means, aid density detecting means outputting a control signal to said new halogen gas storing means when said density is lower than a predetermined value for controllably supplying the new halogen gas to said circulating means whereby the level of halogen gas in said laser device is maintained above a predetermined level.

2. A halogen gas excimer laser device, comprising:
   a halogen gas excimer laser having an oscillation section comprising an output and output port;
   a path connected to said laser oscillation section for circulating a laser gas in a stream between said output and input ports;
   controllable valve means connected to said laser gas circulating path;
   a halogen gas storing chamber disposed at a downstream position of said laser gas circulating path and connected to said path by said controllable valve means;
   a controlling gas path connected at an upstream portion of said laser gas circulating path;
   filter means for filtering said halogen gas flowing through said controlling gas path, said filter being responsive to said halogen gas for discharging a low-boiling-point gas; and
   gas detector means for detecting a density of said low-boiling-point gas discharged by said filter, said gas detector means outputting a signal to said controllable valve means whereby a halogen gas stored in said halogen gas storing chamber is supplied to a downstream position of said circulating path when said density of said low-boiling-point gas is judged lower than a predetermined value, whereby the level of halogen gas in said laser device is maintained above a predetermined level.

3. The gas control deice of claim 2, wherein said halogen gas comprises fluorine gas.

4. The gas control device of claim 3, wherein an inert gas is mixed with said fluorine gas.

5. The gas control device of claim 4, wherein said inert gas comprises at least one of the group consisting of argon gas, krypton gas, Neon gas and helium gas.

6. The gas control device of claim 2, wherein said halogen gas comprises hydrogen chloride gas.

7. The gas control device of claim 2, wherein said halogen gas comprises chlorine gas.

8. The gas control device of claim 2, wherein said low-boiling-point gas comprises a hydrogen gas.

9. The gas control device of claim 2, wherein said filter contains therein a reaction material responsive to said halogen to generate said low boiling point gas.

10. The gas control device of claim 9, wherein said material comprises calcium hydride.

11. The gas control device of claim 10, wherein said reaction material comprises sodium hydrogencarbonate.

12. The gas control device of claim 2, wherein said gas density detector is of a thermal conduction type.

13. The gas control device of claim 2, wherein said gas density detector is operative to detect the density of a gas by combustion and said detector generates heat at the time of combustion that is proportional to density.

14. The gas control device of claim 2, herein total pressure of said halogen gas is of the order of 0.3 MPa.

15. The gas control device of claim 2, wherein said halogen gas excimer laser device has a total gas capacity and said halogen gas storing chamber has a capacity which is 5% or less than said total gas capacity of said laser device.

16. The gas control device of claim 2, wherein the gas detecting and control signal output operation of said gas detector is carried out over a predetermined interval of time.

17. The gas control device of claim 2, wherein the gas detecting and control signal output operation of said gas detector is carried out when necessary.

18. The gas control device of claim 2, wherein the gas detecting and control signal output operation of said gas detector is carried out before the operation of the laser device.

19. The gas control device of claim 2, wherein th gas detecting and control signal output operation of said gas detector is carried out after the operation of the laser device.

20. The gas control device of claim 2, wherein the gas detecting said control signal output operation of said gas detector is included in the operation sequence.

21. A method for controlling the halogen content of a circulating gas comprising at least a halogen gas in a halogen gas excimer laser device, comprising steps of:
 sampling said circulating gas;
 converting said halogen gas in said sampled gas into a low-boiling-point gas;
 detecting a density of said low-boiling-point gas; and
 supplying new halogen gas into the device in accordance with the detection result.

22. Method for controlling a gas according to claim 21, wherein said new halogen gas is supplied when said density of said low-boiling-point is lower than a predetermined value.

* * * * *